United States Patent
Titus et al.

(10) Patent No.: US 8,954,028 B2
(45) Date of Patent: Feb. 10, 2015

(54) GEO-REDUNDANT AND HIGH RELIABILITY COMMERCIAL MOBILE ALERT SYSTEM (CMAS)

(75) Inventors: Mark Titus, Annapolis, MD (US); Fei Yang, Odenton, MD (US)

(73) Assignee: TeleCommunication Systems, Inc., Annapolis, MD (US)

( * ) Notice: Subject to any disclaimer, the term of this patent is extended or adjusted under 35 U.S.C. 154(b) by 792 days.

(21) Appl. No.: 12/289,422

(22) Filed: Oct. 28, 2008

(65) Prior Publication Data

US 2010/0075626 A1    Mar. 25, 2010

Related U.S. Application Data

(60) Provisional application No. 61/136,693, filed on Sep. 25, 2008.

(51) Int. Cl.

| | |
|---|---|
| *H04M 11/04* | (2006.01) |
| *H04W 4/22* | (2009.01) |
| *H04W 76/00* | (2009.01) |
| *H04W 4/06* | (2009.01) |
| *H04W 24/04* | (2009.01) |

(52) U.S. Cl.
CPC .............. *H04W 4/22* (2013.01); *H04W 76/007* (2013.01); *H04W 4/06* (2013.01); *H04W 24/04* (2013.01)
USPC ...................... 455/404.1; 455/453; 455/412.2

(58) Field of Classification Search
CPC .......... H04W 24/04; H04W 4/06; H04W 4/22
USPC ........................... 455/404.1, 412.2, 453, 466; 340/870.11; 709/249
See application file for complete search history.

(56) References Cited

U.S. PATENT DOCUMENTS

| | | |
|---|---|---|
| 1,103,073 A | 1/1914 | O'Connel |
| 3,400,222 A | 9/1968 | Nightingale |
| 3,920,908 A | 11/1975 | Kraus |
| 4,310,726 A | 1/1982 | Asmuth |
| 4,399,330 A | 8/1983 | Kuenzel |
| 4,494,119 A | 1/1985 | Wimbush |

(Continued)

FOREIGN PATENT DOCUMENTS

| | | |
|---|---|---|
| FI | PCT/FI99/00935 | 11/1998 |
| GB | 2308528 | 12/1995 |

(Continued)

OTHER PUBLICATIONS

Bond, "Cellular Carriers Use Prepaid Programs to Reach Untapped Markest," Billing World, Mar. 1997, pp. 14-17.

(Continued)

*Primary Examiner* — Qun Shen
(74) *Attorney, Agent, or Firm* — William H. Bollman (57) ABSTRACT

A Commercial Mobile Alert System (CMAS) providing redundant cell broadcast centers (CBC). Multiple CBCs are interfaced to any given base station controller (BSC) or radio network controller (RNC) to provide geo-redundancy and high availability so that the failure of one CBC or a cluster of CBCs at one site will not cause service interruption for the area controlled by the associated BSC or RNC or for the entire service area in the public land mobile network (PLMN) network. The BSC or RNC interfaces to multiple CBCs at multiple sites without changes to the otherwise conventionally existing BSC/RNC, 3GPP 23.041 standard architecture.

5 Claims, 9 Drawing Sheets

(56) References Cited

U.S. PATENT DOCUMENTS

| | | |
|---|---|---|
| 4,651,156 A | 3/1987 | Martinez |
| 4,680,785 A | 7/1987 | Akiyama et al. |
| 4,706,275 A | 11/1987 | Kamil |
| 4,725,719 A | 2/1988 | Oncken et al. |
| 4,756,020 A | 7/1988 | Fodale |
| 4,776,000 A | 10/1988 | Parienti |
| 4,776,003 A | 10/1988 | Harris |
| 4,776,033 A | 10/1988 | Scheinert |
| 4,831,647 A | 5/1989 | D'Avello et al. |
| 4,845,740 A | 7/1989 | Tokuyama et al. |
| 4,852,149 A | 7/1989 | Zwick |
| 4,852,155 A | 7/1989 | Barraud |
| 4,860,341 A | 8/1989 | D'Avello et al. |
| 4,891,638 A | 1/1990 | Davis |
| 4,891,650 A | 1/1990 | Sheffer |
| 4,901,340 A | 2/1990 | Parker et al. |
| 4,935,956 A | 6/1990 | Hellworth et al. |
| 4,951,308 A | 8/1990 | Bishop et al. |
| 4,952,928 A | 8/1990 | Carroll et al. |
| 5,003,585 A | 3/1991 | Richer |
| 5,014,206 A | 5/1991 | Scribner et al. |
| 5,043,736 A | 8/1991 | Darnell et al. |
| 5,046,088 A | 9/1991 | Margulies |
| 5,055,851 A | 10/1991 | Scheffer |
| 5,063,588 A | 11/1991 | Patsiokas et al. |
| 5,068,656 A | 11/1991 | Sutherland |
| 5,068,891 A | 11/1991 | Marshall |
| 5,070,329 A | 12/1991 | Jasinaki |
| 5,081,667 A | 1/1992 | Drori et al. |
| 5,103,449 A | 4/1992 | Jolissaint |
| 5,119,104 A | 6/1992 | Heller |
| 5,127,040 A | 6/1992 | D'Avello et al. |
| 5,128,938 A | 7/1992 | Borras |
| 5,138,648 A | 8/1992 | Palomeque et al. |
| 5,138,650 A | 8/1992 | Stahl et al. |
| 5,144,283 A | 9/1992 | Arens et al. |
| 5,144,649 A | 9/1992 | Zicker et al. |
| 5,159,625 A | 10/1992 | Zicker |
| 5,161,180 A | 11/1992 | Chavous |
| 5,177,478 A | 1/1993 | Wagai et al. |
| 5,187,710 A | 2/1993 | Chou et al. |
| 5,193,215 A | 3/1993 | Olmer |
| 5,208,756 A | 5/1993 | Song |
| 5,214,789 A | 5/1993 | George |
| 5,216,703 A | 6/1993 | Roy |
| 5,218,367 A | 6/1993 | Scheffer et al. |
| 5,220,593 A | 6/1993 | Zicker |
| 5,223,844 A | 6/1993 | Mansell et al. |
| 5,233,642 A | 8/1993 | Renton |
| 5,235,630 A | 8/1993 | Moody et al. |
| 5,239,570 A | 8/1993 | Koster |
| 5,265,155 A | 11/1993 | Castro |
| 5,266,944 A | 11/1993 | Carroll et al. |
| 5,274,802 A | 12/1993 | Altine |
| 5,276,444 A | 1/1994 | McNair |
| 5,289,527 A | 2/1994 | Tiedemann, Jr. |
| 5,291,543 A | 3/1994 | Freese et al. |
| 5,293,642 A | 3/1994 | Lo |
| 5,297,189 A | 3/1994 | Chabernaud |
| 5,299,132 A | 3/1994 | Wortham |
| 5,301,223 A | 4/1994 | Amadon et al. |
| 5,301,234 A | 4/1994 | Mazziotto et al. |
| 5,309,501 A | 5/1994 | Kozik et al. |
| 5,311,572 A | 5/1994 | Frieder et al. |
| 5,321,735 A | 6/1994 | Breeden |
| 5,325,302 A | 6/1994 | Izidon et al. |
| 5,325,418 A | 6/1994 | McGregor et al. |
| 5,327,144 A | 7/1994 | Stilp et al. |
| 5,329,578 A | 7/1994 | Brennan et al. |
| 5,334,974 A | 8/1994 | Simms et al. |
| 5,339,352 A | 8/1994 | Armstrong et al. |
| 5,341,414 A | 8/1994 | Popke |
| 5,343,493 A | 8/1994 | Karimullah |
| 5,347,568 A | 9/1994 | Moody et al. |
| 5,351,235 A | 9/1994 | Lahtinen |
| 5,353,335 A | 10/1994 | D'Urso |
| 5,359,182 A | 10/1994 | Schilling |
| 5,359,642 A | 10/1994 | Castro |
| 5,359,643 A | 10/1994 | Gammino |
| 5,361,212 A | 11/1994 | Class et al. |
| 5,363,425 A | 11/1994 | Mufti et al. |
| 5,369,699 A | 11/1994 | Page et al. |
| 5,374,936 A | 12/1994 | Feng |
| 5,379,451 A | 1/1995 | Nakagoshi et al. |
| 5,381,338 A | 1/1995 | Wysocki et al. |
| 5,384,825 A | 1/1995 | Dillard et al. |
| 5,387,993 A | 2/1995 | Heller et al. |
| 5,388,147 A | 2/1995 | Grimes |
| 5,390,339 A | 2/1995 | Bruckert et al. |
| 5,394,158 A | 2/1995 | Chia |
| 5,396,227 A | 3/1995 | Carroll et al. |
| 5,396,545 A | 3/1995 | Nair et al. |
| 5,396,558 A | 3/1995 | Ishiquro et al. |
| 5,398,190 A | 3/1995 | Wortham |
| 5,404,580 A | 4/1995 | Simpson et al. |
| 5,406,614 A | 4/1995 | Hara |
| 5,408,513 A | 4/1995 | Busch et al. |
| 5,408,519 A | 4/1995 | Pierce et al. |
| 5,408,682 A | 4/1995 | Ranner et al. |
| 5,412,726 A | 5/1995 | Newuk |
| 5,418,537 A | 5/1995 | Bird |
| 5,423,076 A | 6/1995 | Westergren et al. |
| 5,430,759 A | 7/1995 | Yokev et al. |
| 5,432,841 A | 7/1995 | Rimer |
| 5,434,789 A | 7/1995 | Fraker et al. |
| 5,438,615 A | 8/1995 | Moen |
| 5,440,621 A | 8/1995 | Castro |
| 5,454,024 A | 9/1995 | Lebowitz |
| 5,457,737 A | 10/1995 | Wen |
| 5,461,390 A | 10/1995 | Hoshen |
| 5,465,289 A | 11/1995 | Kennedy |
| 5,469,497 A | 11/1995 | Pierce et al. |
| 5,470,233 A | 11/1995 | Fruchterman et al. |
| 5,479,408 A | 12/1995 | Will |
| 5,479,482 A | 12/1995 | Grimes |
| 5,485,161 A | 1/1996 | Vaughn |
| 5,485,163 A | 1/1996 | Singer et al. |
| 5,485,505 A | 1/1996 | Norman et al. |
| 5,488,563 A | 1/1996 | Chazelle et al. |
| 5,497,149 A | 3/1996 | Fast |
| 5,502,761 A | 3/1996 | Duncan et al. |
| 5,506,893 A | 4/1996 | Buscher et al. |
| 5,508,931 A | 4/1996 | Snider |
| 5,509,056 A | 4/1996 | Ericsson et al. |
| 5,513,243 A | 4/1996 | Kage |
| 5,515,287 A | 5/1996 | Hakoyama et al. |
| 5,517,555 A | 5/1996 | Amadon et al. |
| 5,517,559 A | 5/1996 | Hayashi et al. |
| 5,519,403 A | 5/1996 | Bickley et al. |
| 5,532,690 A | 7/1996 | Hertel |
| 5,535,434 A | 7/1996 | Siddoway et al. |
| 5,539,398 A | 7/1996 | Hall et al. |
| 5,543,776 A | 8/1996 | L'Esperance et al. |
| 5,550,897 A | 8/1996 | Seiderman |
| 5,552,772 A | 9/1996 | Janky et al. |
| 5,555,286 A | 9/1996 | Tendler |
| 5,568,119 A | 10/1996 | Schipper et al. |
| 5,570,416 A | 10/1996 | Kroll |
| 5,574,648 A | 11/1996 | Pilley |
| 5,577,100 A | 11/1996 | McGregor et al. |
| 5,579,372 A | 11/1996 | .ANG.str om |
| 5,579,376 A | 11/1996 | Kennedy, III et al. |
| 5,583,918 A | 12/1996 | Nakagawa |
| 5,586,175 A | 12/1996 | Hogan et al. |
| 5,588,009 A | 12/1996 | Will |
| 5,592,535 A | 1/1997 | Klotz |
| 5,604,486 A | 2/1997 | Lauro |
| 5,606,313 A | 2/1997 | Allen et al. |
| 5,606,850 A | 3/1997 | Nakamura |
| 5,610,815 A | 3/1997 | Gudat et al. |
| 5,610,972 A | 3/1997 | Emery et al. |
| 5,614,890 A | 3/1997 | Fox |
| 5,615,116 A | 3/1997 | Gudat et al. |
| 5,621,793 A | 4/1997 | Bednarek et al. |

(56) References Cited

U.S. PATENT DOCUMENTS

| | | | |
|---|---|---|---|
| 5,625,669 A | 4/1997 | McGregor et al. |
| 5,628,051 A | 5/1997 | Salin |
| 5,633,912 A | 5/1997 | Tsoi |
| 5,640,447 A | 6/1997 | Fonseca |
| 5,673,306 A | 9/1997 | Amadon et al. |
| 5,682,600 A | 10/1997 | Salin |
| 5,692,037 A | 11/1997 | Friend |
| 5,722,067 A | 2/1998 | Fougnies et al. |
| 5,732,346 A | 3/1998 | Lazaridis |
| 5,740,534 A | 4/1998 | Ayerst et al. |
| 5,761,618 A | 6/1998 | Lynch et al. |
| 5,767,795 A | 6/1998 | Schaphorst |
| 5,768,509 A | 6/1998 | Gunluk |
| 5,774,533 A | 6/1998 | Patel |
| 5,778,313 A | 7/1998 | Fougnies |
| 5,787,357 A | 7/1998 | Salin |
| 5,790,636 A | 8/1998 | Marshall |
| 5,793,859 A | 8/1998 | Matthews |
| 5,794,142 A | 8/1998 | Vanttila et al. |
| 5,797,091 A | 8/1998 | Clise et al. |
| 5,797,094 A | 8/1998 | Houde et al. |
| 5,797,096 A | 8/1998 | Lupien et al. |
| 5,802,492 A | 9/1998 | DeLorme et al. |
| 5,806,000 A | 9/1998 | Vo et al. |
| 5,815,816 A | 9/1998 | Isumi |
| 5,822,700 A | 10/1998 | Hult et al. |
| 5,826,185 A | 10/1998 | Wise et al. |
| 5,828,740 A | 10/1998 | Khuc et al. |
| 5,850,599 A | 12/1998 | Seiderman |
| 5,854,975 A | 12/1998 | Fougnies et al. |
| 5,905,736 A | 5/1999 | Ronen et al. |
| 5,920,820 A | 7/1999 | Qureshi |
| 5,920,821 A | 7/1999 | Seazholtz et al. |
| 5,930,701 A | 7/1999 | Skog |
| 5,940,755 A | 8/1999 | Scott |
| 5,943,399 A | 8/1999 | Bannister et al. |
| 5,946,629 A | 8/1999 | Sawyer et al. |
| 5,946,630 A | 8/1999 | Willars et al. |
| 5,950,130 A | 9/1999 | Coursey |
| 5,953,398 A | 9/1999 | Hill |
| 5,974,054 A | 10/1999 | Couts et al. |
| 5,974,133 A | 10/1999 | Fleischer |
| 5,978,685 A | 11/1999 | Laiho |
| 5,983,091 A | 11/1999 | Rodriguez |
| 5,987,323 A | 11/1999 | Huotari |
| 5,999,811 A | 12/1999 | Molne |
| 6,026,292 A | 2/2000 | Coppinger et al. |
| 6,029,062 A | 2/2000 | Hanson |
| 6,035,025 A | 3/2000 | Hanson |
| 6,049,710 A | 4/2000 | Nilsson |
| 6,058,300 A | 5/2000 | Hanson |
| 6,064,875 A | 5/2000 | Morgan |
| 6,070,067 A | 5/2000 | Nguyen et al. |
| 6,073,004 A | 6/2000 | Balachandran |
| 6,073,015 A | 6/2000 | Berggren et al. |
| 6,075,982 A | 6/2000 | Donovan et al. |
| 6,081,508 A | 6/2000 | West et al. |
| 6,101,378 A | 8/2000 | Barabash et al. |
| 6,115,458 A | 9/2000 | Taskett |
| 6,119,014 A | 9/2000 | Alperovich et al. |
| 6,122,503 A | 9/2000 | Daly |
| 6,122,520 A | 9/2000 | Want et al. |
| 6,138,158 A | 10/2000 | Boyle et al. |
| 6,148,197 A | 11/2000 | Bridges et al. |
| 6,148,198 A | 11/2000 | Anderson et al. |
| 6,149,353 A | 11/2000 | Nilsson |
| 6,157,823 A | 12/2000 | Fougnies et al. |
| 6,169,891 B1 | 1/2001 | Gorham et al. |
| 6,173,181 B1 | 1/2001 | Losh |
| 6,181,935 B1 | 1/2001 | Gossman et al. |
| 6,188,752 B1 | 2/2001 | Lesley |
| 6,195,543 B1 | 2/2001 | Granberg |
| 6,198,431 B1 | 3/2001 | Gibson |
| 6,199,045 B1 | 3/2001 | Giniger et al. |
| 6,205,330 B1 | 3/2001 | Winbladh |
| 6,208,854 B1 | 3/2001 | Roberts et al. |
| 6,208,870 B1 | 3/2001 | Lorello et al. |
| 6,219,669 B1 | 4/2001 | Haff et al. |
| 6,223,046 B1 | 4/2001 | Hamill-Keays et al. |
| 6,226,529 B1 | 5/2001 | Bruno et al. |
| 6,249,680 B1 | 6/2001 | Wax et al. |
| 6,249,744 B1 | 6/2001 | Morita |
| 6,266,614 B1 | 7/2001 | Alumbaugh |
| 6,289,373 B1 | 9/2001 | Dezonno |
| 6,314,108 B1 | 11/2001 | Ramasubramani |
| 6,317,594 B1 | 11/2001 | Gossman et al. |
| 6,321,257 B1 | 11/2001 | Kotola et al. |
| 6,327,479 B1 | 12/2001 | Mikkola |
| 6,335,968 B1 | 1/2002 | Malik |
| 6,353,621 B1 | 3/2002 | Boland |
| 6,356,630 B1 | 3/2002 | Cai et al. |
| 6,370,242 B1 | 4/2002 | Speers et al. |
| 6,370,373 B1 | 4/2002 | Gerth |
| 6,373,930 B1 | 4/2002 | McConnel et al. |
| 6,381,316 B2 | 4/2002 | Joyce et al. |
| 6,381,535 B1 | 4/2002 | Durocher et al. |
| 6,393,014 B1 | 5/2002 | Daly et al. |
| 6,393,269 B1 | 5/2002 | Hartmaier et al. |
| 6,396,913 B1 | 5/2002 | Perkins, III |
| 6,397,054 B1 | 5/2002 | Hoirup et al. |
| 6,397,055 B1 | 5/2002 | McHenry et al. |
| 6,397,064 B1 | 5/2002 | Bridges |
| 6,442,257 B1 | 8/2002 | Gundlach |
| 6,453,426 B1 * | 9/2002 | Gamache et al. ............ 714/4.21 |
| 6,456,852 B2 | 9/2002 | Bar et al. |
| 6,473,622 B1 | 10/2002 | Meuronen |
| 6,480,710 B1 | 11/2002 | Laybourn et al. |
| 6,483,907 B1 | 11/2002 | Wong et al. |
| 6,490,450 B1 | 12/2002 | Batni et al. |
| 6,496,690 B1 | 12/2002 | Cobo et al. |
| 6,505,046 B1 | 1/2003 | Baker |
| 6,507,589 B1 | 1/2003 | Ramasubramani |
| 6,512,930 B2 | 1/2003 | Sandegren |
| 6,526,335 B1 | 2/2003 | Treyz et al. |
| 6,529,593 B2 | 3/2003 | Nelson |
| 6,529,732 B1 | 3/2003 | Vainiomaki et al. |
| 6,587,688 B1 | 7/2003 | Chambers et al. |
| 6,609,004 B1 | 8/2003 | Morse et al. |
| 6,621,810 B1 | 9/2003 | Leung |
| 6,654,786 B1 | 11/2003 | Fox et al. |
| 6,658,260 B2 | 12/2003 | Knotts |
| 6,667,688 B1 | 12/2003 | Menard et al. |
| 6,677,894 B2 | 1/2004 | Sheynblat |
| 6,728,353 B1 | 4/2004 | Espejo et al. |
| 6,728,635 B2 | 4/2004 | Sakamoto et al. |
| 6,731,943 B1 | 5/2004 | McCormick et al. |
| 6,782,258 B2 | 8/2004 | Ung et al. |
| 6,807,580 B2 * | 10/2004 | Freeman et al. ............ 709/249 |
| 6,868,074 B1 | 3/2005 | Hanson |
| 6,898,633 B1 * | 5/2005 | Lyndersay et al. ........... 709/226 |
| 6,915,138 B2 | 7/2005 | Kraft |
| 6,952,575 B1 | 10/2005 | Countryman et al. |
| 6,970,869 B1 | 11/2005 | Slaughter et al. |
| 6,993,325 B1 | 1/2006 | Waesterlid |
| 7,020,480 B2 | 3/2006 | Coskun et al. |
| 7,110,773 B1 | 9/2006 | Wallace et al. |
| 7,120,418 B2 | 10/2006 | Herajarvi |
| 7,127,264 B2 | 10/2006 | Hronek et al. |
| 7,130,383 B2 | 10/2006 | Naidoo et al. |
| 7,145,462 B2 | 12/2006 | Dewing et al. |
| 7,180,415 B2 | 2/2007 | Bankert et al. |
| 7,245,216 B2 | 7/2007 | Burkley et al. |
| 7,317,705 B2 | 1/2008 | Hanson |
| 7,328,031 B2 | 2/2008 | Kraft |
| 7,356,328 B1 | 4/2008 | Espejo et al. |
| 7,386,588 B2 | 6/2008 | Mousseau et al. |
| 7,392,038 B1 | 6/2008 | Ratschunas et al. |
| 7,437,348 B1 * | 10/2008 | Wyett et al. ........................ 1/1 |
| 7,792,989 B2 * | 9/2010 | Toebes et al. ................. 709/238 |
| 7,809,382 B2 | 10/2010 | Smith et al. |
| 7,826,818 B2 * | 11/2010 | Gollnick et al. ............ 455/343.4 |
| 7,860,068 B2 | 12/2010 | Smith et al. |
| 7,864,927 B2 | 1/2011 | Loizeaux |
| 2001/0006889 A1 | 7/2001 | Kraft |

(56) References Cited

U.S. PATENT DOCUMENTS

| | | | |
|---|---|---|---|
| 2001/0031641 A1 | 10/2001 | Ung et al. | |
| 2001/0034224 A1 | 10/2001 | McDowell et al. | |
| 2001/0040949 A1 | 11/2001 | Blonder | |
| 2002/0068546 A1 | 6/2002 | Plush et al. | |
| 2002/0098851 A1 | 7/2002 | Walczak et al. | |
| 2002/0103762 A1 | 8/2002 | Lopez | |
| 2002/0133568 A1 | 9/2002 | Smith et al. | |
| 2002/0168986 A1 | 11/2002 | Lau et al. | |
| 2002/0181681 A1 | 12/2002 | Mani | |
| 2003/0003909 A1* | 1/2003 | Keronen et al. | 455/434 |
| 2003/0017832 A1 | 1/2003 | Anderson et al. | |
| 2003/0058096 A1 | 3/2003 | Shteyn | |
| 2003/0086422 A1 | 5/2003 | Klinker et al. | |
| 2003/0119525 A1 | 6/2003 | Rajkotia | |
| 2003/0120826 A1 | 6/2003 | Shay | |
| 2003/0186709 A1 | 10/2003 | Rhodes et al. | |
| 2003/0186710 A1* | 10/2003 | Muhonen et al. | 455/456.5 |
| 2004/0103431 A1 | 5/2004 | Davenport et al. | |
| 2004/0110524 A1 | 6/2004 | Takano | |
| 2004/0137921 A1 | 7/2004 | Valloppillil et al. | |
| 2004/0176123 A1 | 9/2004 | Chin | |
| 2004/0199614 A1 | 10/2004 | Shenfield et al. | |
| 2004/0203900 A1 | 10/2004 | Cedervall et al. | |
| 2005/0003803 A1* | 1/2005 | Buckley | 455/414.1 |
| 2005/0020242 A1* | 1/2005 | Holland et al. | 455/404.2 |
| 2005/0020287 A1 | 1/2005 | Pohutsky et al. | |
| 2005/0048948 A1 | 3/2005 | Holland et al. | |
| 2005/0101338 A1 | 5/2005 | Kraft | |
| 2005/0119012 A1 | 6/2005 | Merheb et al. | |
| 2005/0135569 A1 | 6/2005 | Dickinson et al. | |
| 2005/0176445 A1* | 8/2005 | Qu et al. | 455/458 |
| 2005/0186974 A1 | 8/2005 | Cai | |
| 2005/0190789 A1 | 9/2005 | Salkini | |
| 2005/0213716 A1 | 9/2005 | Zhu et al. | |
| 2005/0261012 A1* | 11/2005 | Weiser | 455/466 |
| 2005/0265536 A1 | 12/2005 | Smith | |
| 2005/0282518 A1 | 12/2005 | D'Evelyn | |
| 2006/0020965 A1* | 1/2006 | Steelberg et al. | 725/36 |
| 2006/0028995 A1* | 2/2006 | Canoy et al. | 370/252 |
| 2006/0053197 A1 | 3/2006 | Yoshimura | |
| 2006/0109960 A1 | 5/2006 | D'Evelyn | |
| 2006/0148415 A1 | 7/2006 | Hamalainen | |
| 2006/0183460 A1 | 8/2006 | Srinivasan et al. | |
| 2006/0221968 A1* | 10/2006 | Razdan et al. | 370/392 |
| 2006/0223549 A1* | 10/2006 | Chang | 455/456.2 |
| 2006/0225090 A1 | 10/2006 | Shim et al. | |
| 2006/0276168 A1 | 12/2006 | Fuller et al. | |
| 2006/0293066 A1 | 12/2006 | Edge et al. | |
| 2007/0021098 A1 | 1/2007 | Rhodes | |
| 2007/0026871 A1 | 2/2007 | Wager | |
| 2007/0060097 A1 | 3/2007 | Edge et al. | |
| 2007/0110076 A1 | 5/2007 | Brouwer et al. | |
| 2007/0117574 A1 | 5/2007 | Watanabe | |
| 2007/0117577 A1 | 5/2007 | Harris | |
| 2007/0136132 A1* | 6/2007 | Weiser et al. | 705/14 |
| 2007/0149208 A1 | 6/2007 | Syrbe et al. | |
| 2007/0149213 A1 | 6/2007 | Lamba et al. | |
| 2008/0294648 A1* | 11/2008 | Lin et al. | 707/10 |
| 2009/0221263 A1 | 9/2009 | Titus et al. | |
| 2009/0323636 A1* | 12/2009 | Dillon et al. | 370/331 |
| 2010/0076767 A1 | 3/2010 | Vieri et al. | |
| 2010/0120412 A1* | 5/2010 | Tang et al. | 455/422.1 |

FOREIGN PATENT DOCUMENTS

| | | |
|---|---|---|
| NO | PCT/NO99/00178 | 6/1997 |
| SE | PCT/SE98/00992 | 5/1998 |
| SE | PCT/SE99/00875 | 5/1999 |

OTHER PUBLICATIONS

Robbrock, The Intelligent Network—Changing the Face of Telecommunications, IEEE, Jan. 1991, pp. BCG 21207-BCG 21220.

MultiMedia Publishing Corp., "Prepaid Cellular and Prepaid Wireless Market Report and Forecast 1997-2002," sales literature, undated.

Nextlink, "Introducing a New Prepaid Telephone Service from NEXTLINK," sales literature, undated.

Open Development Corp., "openMedia Cellular Prepaid," sales literature, undated.

Tecore, Inc., "Pre-Paid Cellular," sales literature, Mar. 25, 1997, pp. 1-4.

Open Mobile Alliance, user Plane Location Protocol Candidate Version 1.0, OMA-TS-ULP-V1_0-20060127-C, Jan. 27, 2006, pp. 1-66.

Sable et al., Intelligent Networking: Network Systems, AT&T Technical Journal, Summer 1991, vol. 3-4, pp. 1-84.

The Power of Mobile Unified Messaging; Siemans and Comverse to Demonstrate WAP-Based Messaging Applications on Live GBRS System, Comverse, Feb. 2000.

Open Mobile Alliance, Secure User Plane Location Architecture Candidate Version 1.0, OMA-AD-SUPL-V1_0-20060127-C, Jan. 27, 2006, pp. 1-180.

"Technology Rides Control Network to Support Short Package Applications"; Advanced Intelligent Network New. Washington, DC: Mar. 19, 1997. vol. 7, Iss. 6; p. 1.

Cellular Mobile Pricing Structures and Trends; Dr. Sam Paltridge of the OECD's Directorate for Science, Technology and Industry; Dist.: May 19, 2000 (Nov. 1999).

47 code of federal regulations (Jan. 10, 2005 Edition).

Newsletter "Sonera Bill Warning" Digital Cellular Report. Stevenage: Jun. 17, 1998. vol. 4, Iss.; p. 1.

International Search Report received in PCT/US11/01971 dated Feb. 28, 2013.

* cited by examiner

ns from the secondary CBC server.

GEO-REDUNDANT AND HIGH RELIABILITY COMMERCIAL MOBILE ALERT SYSTEM (CMAS)

This application claims priority from U.S. Provisional Appl. No. 61/136,693, filed Sep. 25, 2008, entitled "Multiple Cell Broadcast Centers (CBC) System", by Mark Titus et al., the entirety of which is expressly incorporated herein by reference.

BACKGROUND OF THE INVENTION

1. Field of the Invention

This invention relates generally to wireless telecommunications, and more particularly to wireless cell broadcast messaging for commercial and emergency services.

2. Background of the Related Art

Cell Broadcast (CB) messaging is a mobile technology feature defined by the ETSI's GSM committee and is part of the GSM standard. It is also known as Short Message Service-Cell Broadcast (SMS-CB). Cell Broadcast is designed for simultaneous delivery of messages to multiple users in a specified area. Whereas the Short Message Service-Point to Point (SMS-PP) is a one-to-one and one-to-a-few service, Cell Broadcast is a one-to-many geographically focused messaging service. Cell Broadcast messaging is also supported by UMTS, as defined by 3GPP.

Cell Broadcast is a mobile technology that allows a text or binary message to be defined and distributed to all mobile handsets and similar devices connected to a set of cells (i.e., within a designated geographical area). The broadcast range can be varied, from a single cell to the entire network.

Whereas SMS messages are sent point-to-point, Cell Broadcast messages are sent point-to-area. This means that one Cell Broadcast message can reach a huge number of mobile devices at once. In other words, Cell Broadcast messages are directed to radio cells, rather than to a specific mobile device. A Cell Broadcast message is an unconfirmed PUSH service, meaning that the originator of the message does not know who has received the message, allowing for services based on anonymity.

In Europe, most handsets do have cell broadcast capability, and the major European operators have deployed the technology in their networks.

Cell broadcast elements (CBEs) are usually connected to a Content Casting Center (CCC), which is in turn connected to a single Cell Broadcast Center. Cell Broadcast messages are then sent from the single Cell Broadcast Centers to the cells. Advanced infrastructures make use of GIS-based interfaces for definition of the used areas.

As currently defined, Cell Broadcast message page comprises 82 octets, which, using the default character set, equates to 93 characters. Up to 15 of these pages may be concatenated to form a Cell Broadcast message. Each page of such a CB message has the same message identifier (indicating the source of the message), and the same serial number. Using this information, the mobile telephone is able to identify and ignore broadcasts of already received messages.

Figure 6:
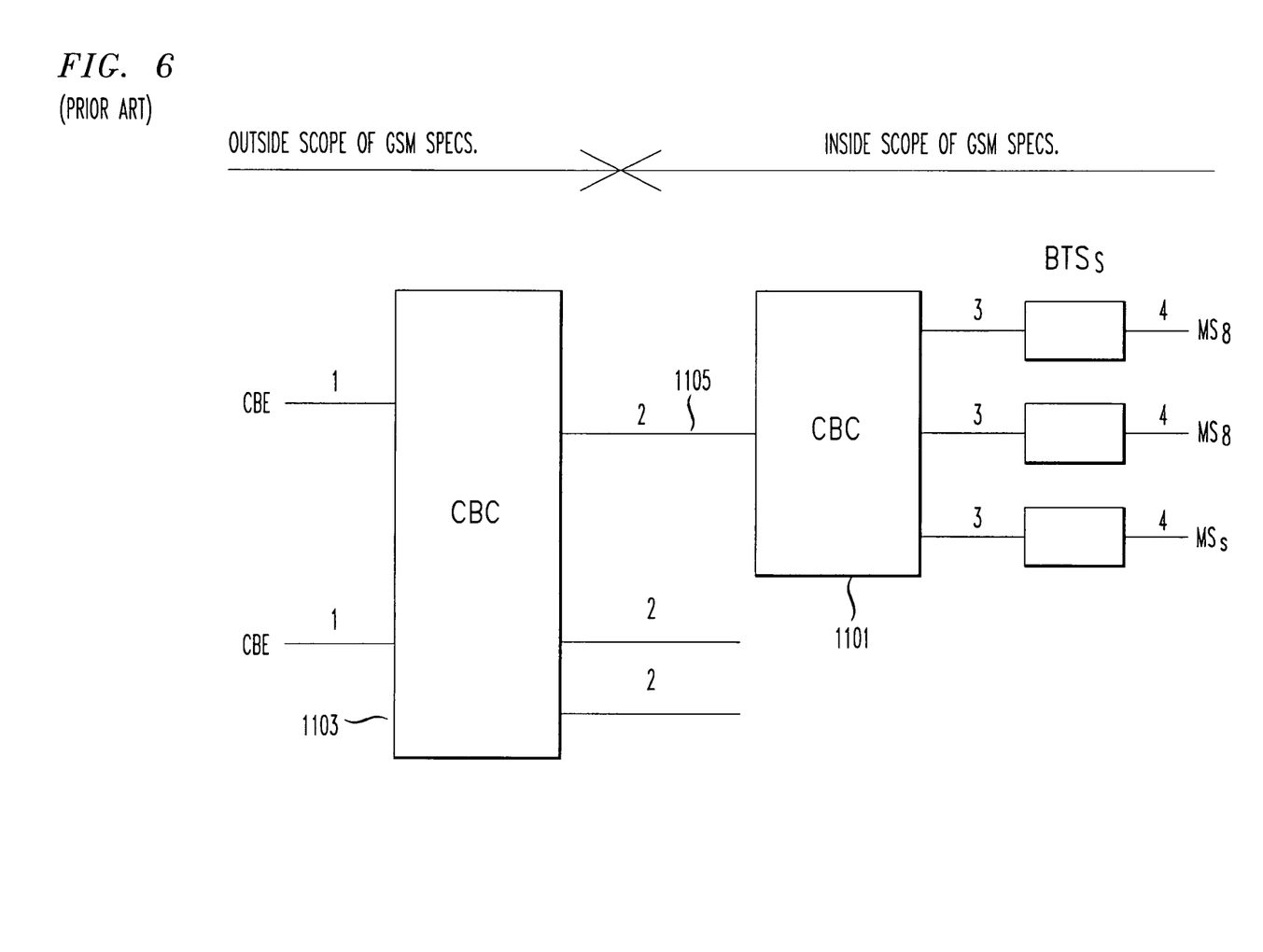
FIG. 6 depicts conventional Global System for Mobile Communications (GSM) cell broadcast architecture that is used today.

FIG. 6 depicts conventional Global System for Mobile Communications (GSM) cell broadcast architecture that is used today.

In particular, as shown in FIG. 6, in conventional GSM cell broadcast architecture, a base station controller (BSC) 1101 interfaces to a single cell broadcast center (CBC) 1103 over a one-to-one interface 1105.

Figure 7:
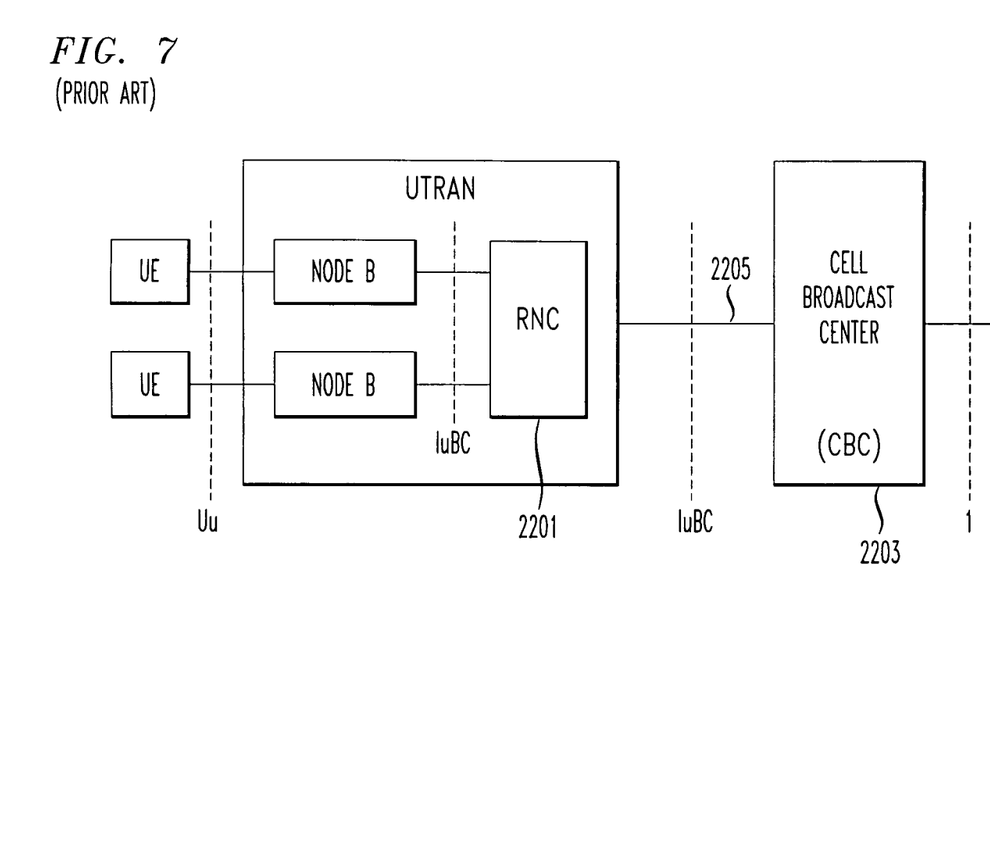
FIG. 7 shows conventional Universal Mobile Telecommunications Service (UMTS) cell broadcast architecture that is used today.
Figure 8:
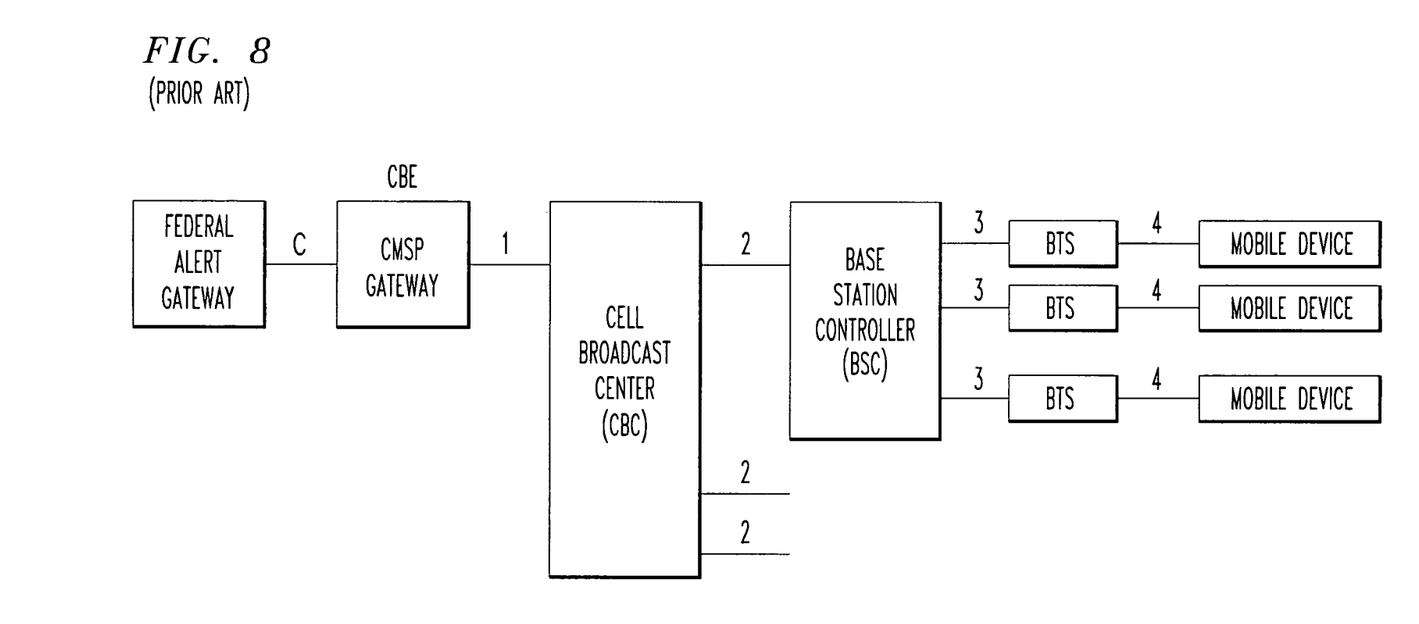
FIG. 8 shows a conventional commercial mobile alert system (CMAS) architecture functional for use of emergency alert information passed in a GSM network.
Figure 9:
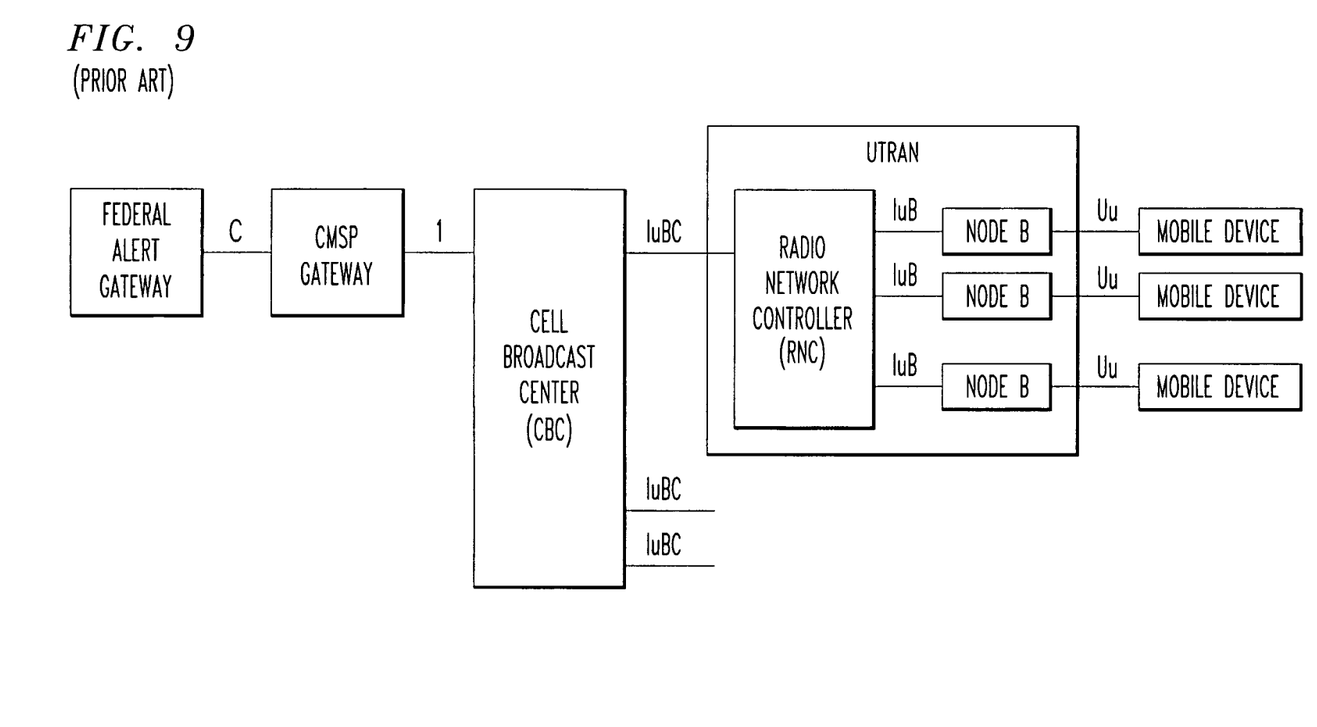
FIG. 9 shows a conventional commercial mobile alert system (CMAS) architecture functional for use of emergency alert information passed in a UMTS network.

FIG. 7 shows conventional Universal Mobile Telecommunications Service (UMTS) cell broadcast architecture that is used today.

In particular, as shown in FIG. 7, in conventional UMTS cell broadcast architecture, a radio network controller (RNC) 2201 interfaces to a single cell broadcast center (CBC) 2203 over a one-to-one interface 2205.

Thus, in both GSM cell broadcast systems as well as in UMTS cell broadcast systems, base station controllers (BSCs) and radio network controllers (RNCs) interface on a one-to-one basis with a dedicated respective cell broadcast center (CBC).

This one-to-one dedicated architecture is embodied in current cell broadcast standard architecture defined for both GSM and UMTS networks. Thus, a base station controller (BSC), or a radio network controller (RNC), can only interface to one cell broadcast center (CBC). See, e.g., requirements set forth in Section 6 of 3GPP TS 23.041—"The BSC/RNC shall interface to only one CBC".

The Commercial Mobile Alert System (CMAS) is an emerging, nationwide warning system that utilizes cell phone SMS to alert the public of emergencies. Using CMAS, as currently envisioned, three types of emergencies will be relayed to the public: a disaster, imminent or ongoing threats, and child abductions (Amber Alerts). As designed, a government agency generates an emergency message (e.g., from a Federal Alert Gateway) and sends it to participating carriers or service providers, who then relay the emergency message to the public via SMS (or vibration or audio cues for the disabled).

SUMMARY OF THE INVENTION

In accordance with the principles of the present invention, geo-redundancy is provided in a commercial mobile alert system (CMAS) by a base station controller; and a plurality of cell broadcast centers (CBCs) interfaced to the base station controller. In this way, redundancy is provided in the CBC in a given geographical area.

In accordance with another aspect of the invention, a commercial mobile alert system (CMAS) comprises a cell broadcast entity to handle an emergency alert message to be transmitted via a cell broadcast center. A cell broadcast center (CBC) server farm comprising a plurality of CBC servers is configured to accept the emergency alert message from the cell broadcast entity. Either a base station controller (BSC) or a radio network controller (RNC) is in communication with the plurality of CBC servers. The BSC/RNC is configured to receive the emergency alert message from only one of the plurality of CBC servers.

In yet another aspect of the invention, global load balancing is achieved by distributing traffic between two commercial mobile alert system (CMAS) sites via a DNS name resolution process, comprising querying a primary domain name server (DNS) for an address of a content management service provider (CMSP) gateway. If the primary DNS is not available, a secondary DNS is queried. An address resolution request is sent either to a first site load balancer, or to a second site load balancer, using a load balance scheme. A virtual IP is returned to a querying source of an emergency alert message.

A method of global load balancing achieved by distributing traffic between two commercial mobile alert system (CMAS) sites via global load balancing in accordance with yet another aspect of the invention comprises a primary CMSP gateway at a first site, and a secondary CMSP gateway at a second site. A federal alert gateway is configured to broadcast emergency alert messages to a first IP address associated with the primary CMSP gateway, and with a second IP address associated with the secondary CMSP gateway. In this way a first global load balancer at the first site communicates directly with both the primary CMSP gateway and the secondary CMSP gateway. A global load balance scheme is achieved wherein the load of emergency alert messaging is distributed across all CMSP servers.

A cell broadcast center regional approach in accordance with still another aspect, comprises assigning each of a plurality of cell broadcast centers (CBCs) to a respective BSC/RNC of a specific region of a public land mobile network (PLMN). Geo-targeting is performed by sending an emergency alert message to a BSC/RNC in a specific region that is in an alert target area of the emergency alert message. The emergency alert message is dropped by a given CBC if the alert target area has no overlap with a region controlled by the given CBC. In this way, CMSP gateway server farms always send alert messages received from a federal alert gateway to CBCs in all regions regardless of desired target area of a given emergency alert message.

BRIEF DESCRIPTION OF THE DRAWINGS

Features and advantages of the present invention will become apparent to those skilled in the art from the following description with reference to the drawings, in which.

DETAILED DESCRIPTION OF ILLUSTRATIVE EMBODIMENTS

The Commercial Mobile Alert System (CMAS) currently proposed by the United States Federal Government utilizes the cell broadcast architecture defined 3GPP TS 23.041 in a GSM/UMTS environment. But the limitations of BSC/RNC architecture in GSM/UMTS cell broadcast architecture does not allow deployment of multiple cell broadcast centers (CBCs) with geo-redundancy and high availability.

Because of the limitations of conventional architecture that provides one-to-one interfacing between a BSC or RNC, and a single cell broadcast center (CBC), conventional cell broadcast centers (CBCs) cannot be deployed in a load sharing (i.e., active-active) mode.

For NON-emergency cell broadcast services in a commercial mobile alert system (CMAS), it is conventionally acceptable to have a base station controller (BSC) interface to only one cell broadcast center (CBC) (in the case of a GSM cell broadcast architecture), or a radio network controller (RNC) interface to only one CBC (in the case of a UMTS cell broadcast architecture). But the present inventors have appreciated that when a cell broadcast center (CBC) associated with its respective BSC or RNC goes down, the geographic area controlled by that BSC or RNC will lose cell broadcast service, and won't be capable at that time of delivering the emergency alert. For successful implementation of CMAS for use in wide-scale emergency situations, the present inventors have appreciated that geo-redundancy techniques and architectures must be implemented to allow high reliability and assurance that an emergency alert message is received by all eligible mobile devices.

The present invention enables delivery of emergency alert information using a Commercial Mobile Alert System (CMAS). In accordance with the principles of the present invention, the present inventors provide (contrary to current standards) the use of multiple CBCs interfaced to a given BSC or RNC, despite what would seem to conventionally be detrimental aspects. Such contrary interfacing in accordance with the present invention provides an environment that supports geo-redundancy and high availability so that the failure of one CBC or a cluster of CBCs at one site will not cause service interruption for the area controlled by the associated BSC or RNC or for the entire service area in the public land mobile network (PLMN) network.

The present invention enables a base station controller (BSC) or radio network controller (RNC) to importantly interface to multiple CBCs at multiple sites without changes to the otherwise conventionally existing BSC/RNC, 3GPP 23.041 standard architecture. The present invention also provides various geo-redundant and high availability solutions for CMAS in which multiple CBCs are supported.

The present invention provides a geo-redundant and high availability CMAS system utilizing connection of the BSC/RNC to multiple CBCs.

Figure 1:
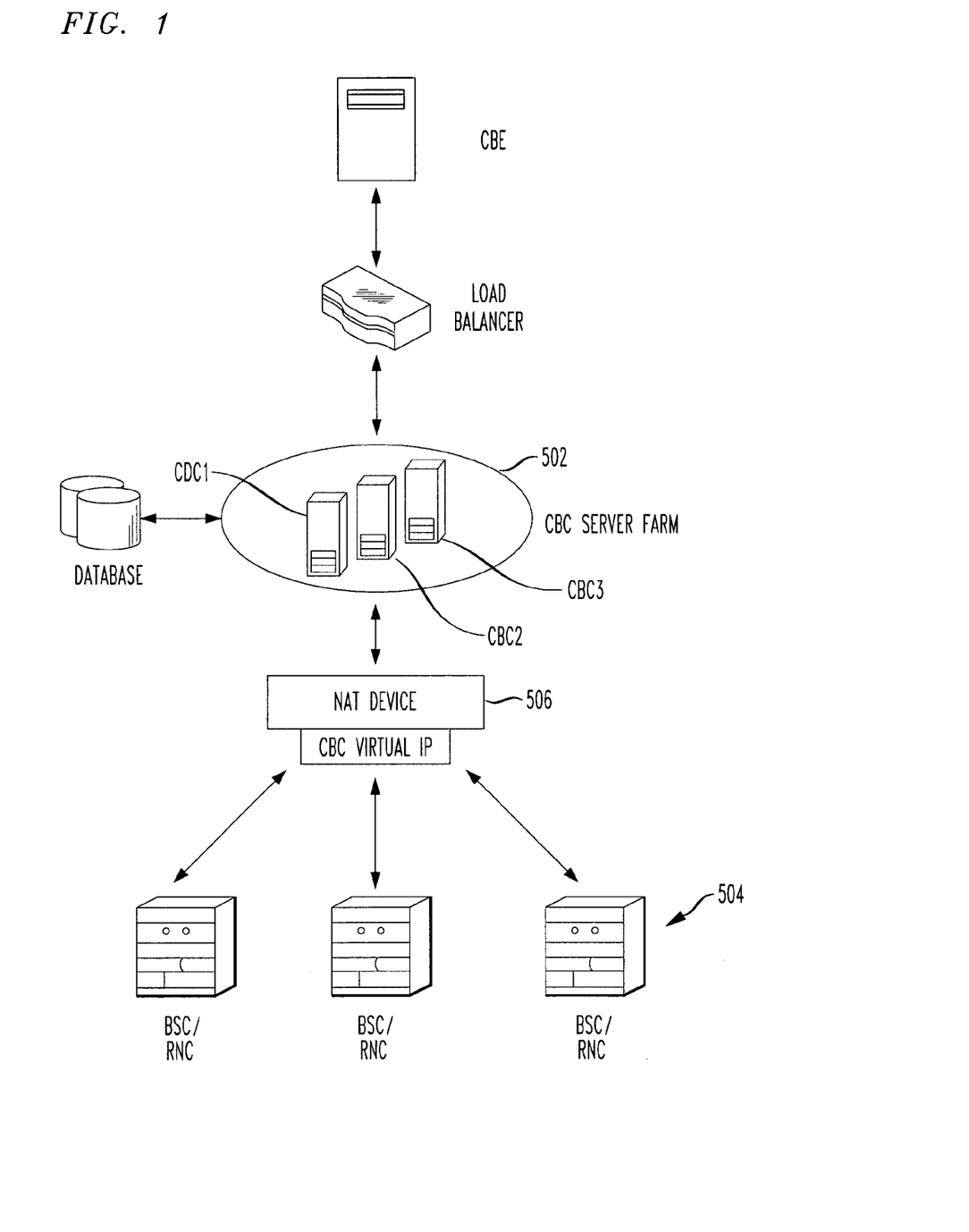
FIG. 1 shows use of multiple CBCs deployed in active-active mode in a commercial mobile alert system (CMAS), in accordance with the principles of the present invention.

FIG. 1 shows use of multiple CBCs deployed in active-active mode in a commercial mobile alert system (CMAS), in accordance with the principles of the present invention.

In particular, as shown in FIG. 1, multiple CBCs 502 are deployed in active-active mode. The CBCs in the CBC server farm 502 communicate with the BSC/RNC(s) 504 through a Network Address Translation (NAT) device 506 which presents a single Virtual IP (VIP) address to the BSC/RNC 504. The BSC/RNC 504 is configured with the CBC VIP and thus from the perspective of the BSC/RNC 504 there is only one CBC in the CBC server farm 502 and no change to the otherwise conventional BSC/RNC 504 is required.

For a procedure initiated by one of the CBCs in the CBC server farm 502, e.g. WRITE-UPDATE, the CBC 502 first establishes a TCP/IP connection with the BSC/RNC 504 through the NAT device 506 and then sends a request message to the BSC/RNC 504. The BSC/RNC 504 returns a response message preferably via the same TCP/IP connection through NAT device 506 to the CBC that issued the request.

For a procedure initiated by one of the BSC/RNCs 504, e.g. Failure Indication, the BSC/RNC 504 establishes a TCP/IP connection with one of the CBCs in the CBC server farm 502 via the NAT device 506 using the configured CBC VIP. The TCP/IP connection request from the BSC/RNC 504 first hits the NAT device 506 and the NAT device 506 in turn selects one CBC in the CBC server farm 502 to connect to based on load and availability of all CBCs in the CBC server farm 502.

In accordance with the principles of the invention, all CBCs at the same site (e.g., in the CBC server farm 502) share the same database (DB) cluster and the DB clusters at different sites are synchronized. Cell site health status information carried in the response message from the BSC/RNC 504, or unsolicited messages from the BSC/RNC 504, are saved in the database and made available to all CBCs in the CBC server farm 502.

Simple implementation of multiple CBCs would otherwise send different broadcast messages to the same BSC/RNC 504. In accordance with the present invention, to ensure that the serial numbers contained in the messages on the CBC-BSC/RNC interface are unique across all CBCs, a different range of serial numbers is allocated to the CBCs, e.g., using the most significant bits of the serial number field as CBC ID. For instance, in the example of FIG. 1, the two most significant bits of the serial number can be used as CBC ID, where "00" as the two most significant bits corresponds to a first CBC CBC1 in the CBC server farm 502, "01" to a second CBC CBC2, "10" to a third CBC CBC3, etc.

The present invention ensures the uniqueness of message sequence numbering on CMSP gateway-CBC interface. To this end, each message issued by the CMSP gateway to the CBC contains a message sequence number which may be an integer or a string. When there are multiple CMSP Gateway servers active at the same time, it is important that the messages generated by them contain different message sequence numbers. In the case where the message sequence number is expressed as an integer, uniqueness of the message sequence number is ensured by allocating a different range of message sequence numbers to each CMSP Gateway server, so that each server looks at a message sequence number pool which is mutually exclusive to the others. In the case that the message sequence number is expressed as a string, uniqueness of message sequence number is ensured by assignment of a unique server ID to each server, and inclusion of server ID in the message sequence number.

The uniqueness of the serial number on the CBC-BSC/RNC can be ensured by allocation of a different range of serial numbers to each CBC server, so that each server looks at a serial number pool which is mutually exclusive to the others.

Figure 2:
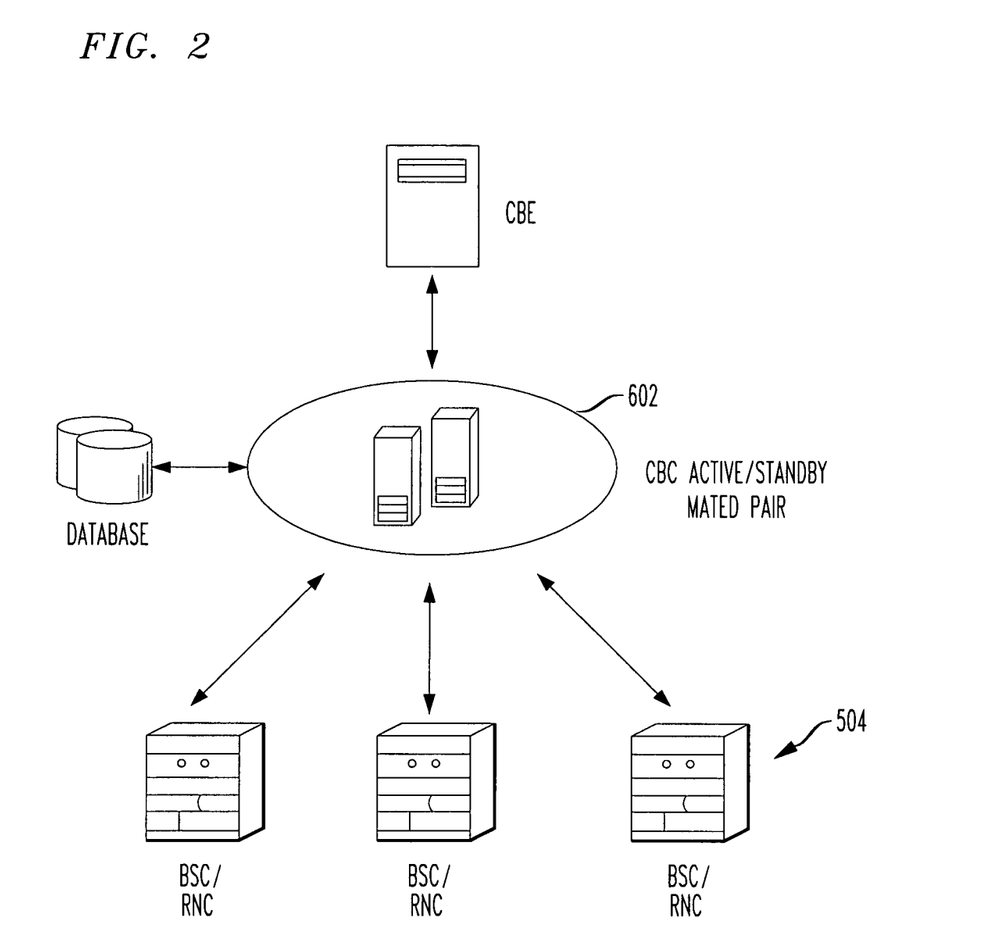
FIG. 2 shows use of multiple CBCs deployed in active-standby mated-pair mode in a commercial mobile alert system (CMAS), in accordance with the principles of the present invention.

FIG. 2 shows use of multiple CBCs deployed in active-standby mated-pair mode in a commercial mobile alert system (CMAS), in accordance with the principles of the present invention.

In particular, as shown in FIG. 2, only one CBC in the CBC active/standby mated pair 602 is active at any given time. Thus, from the perspective of the BSC/RNC 504, there appears to be only one CBC.

Figure 3:
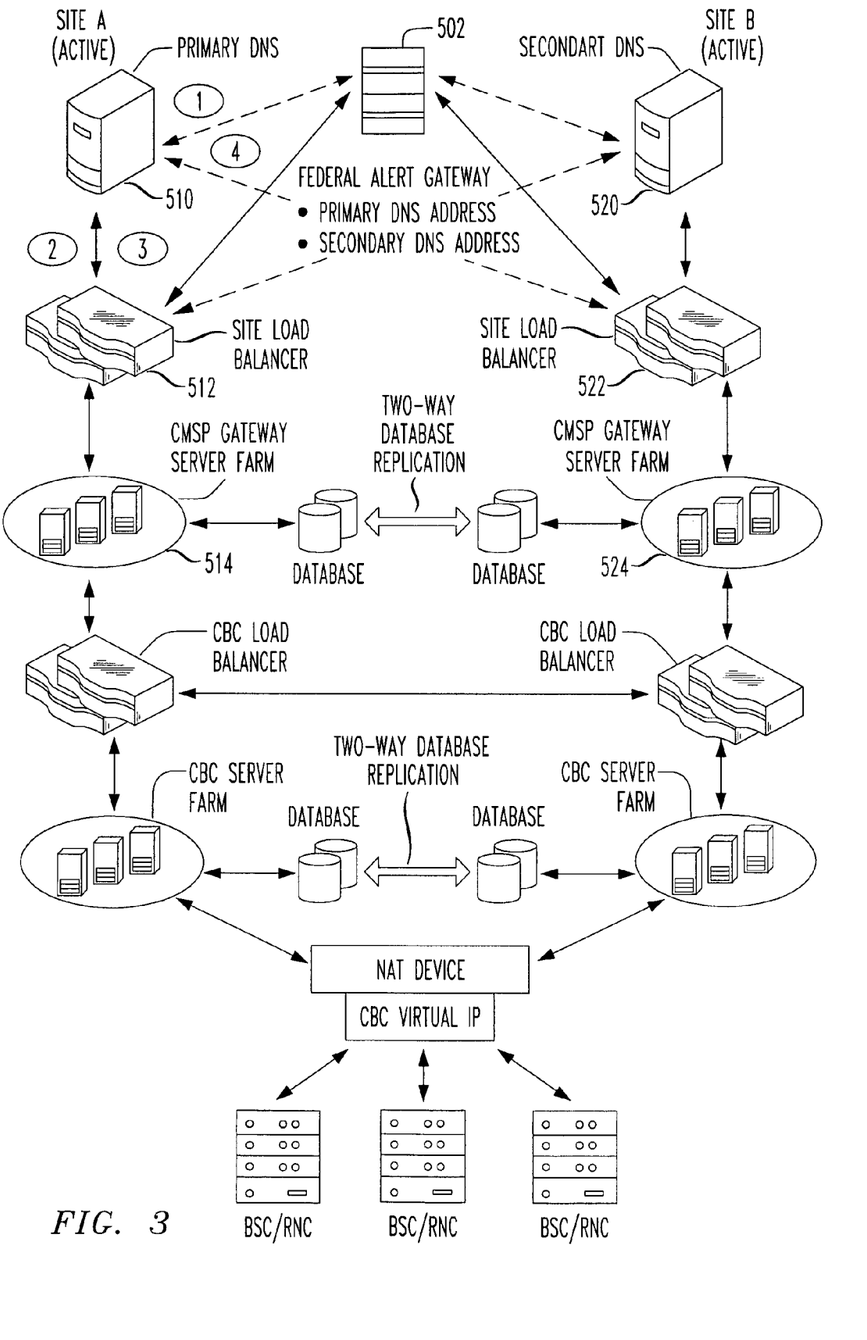
FIG. 3 shows global load balancing achieved by distributing traffic between two sites via a DNS name resolution process, in accordance with the principles of the present invention.
Figure 4:
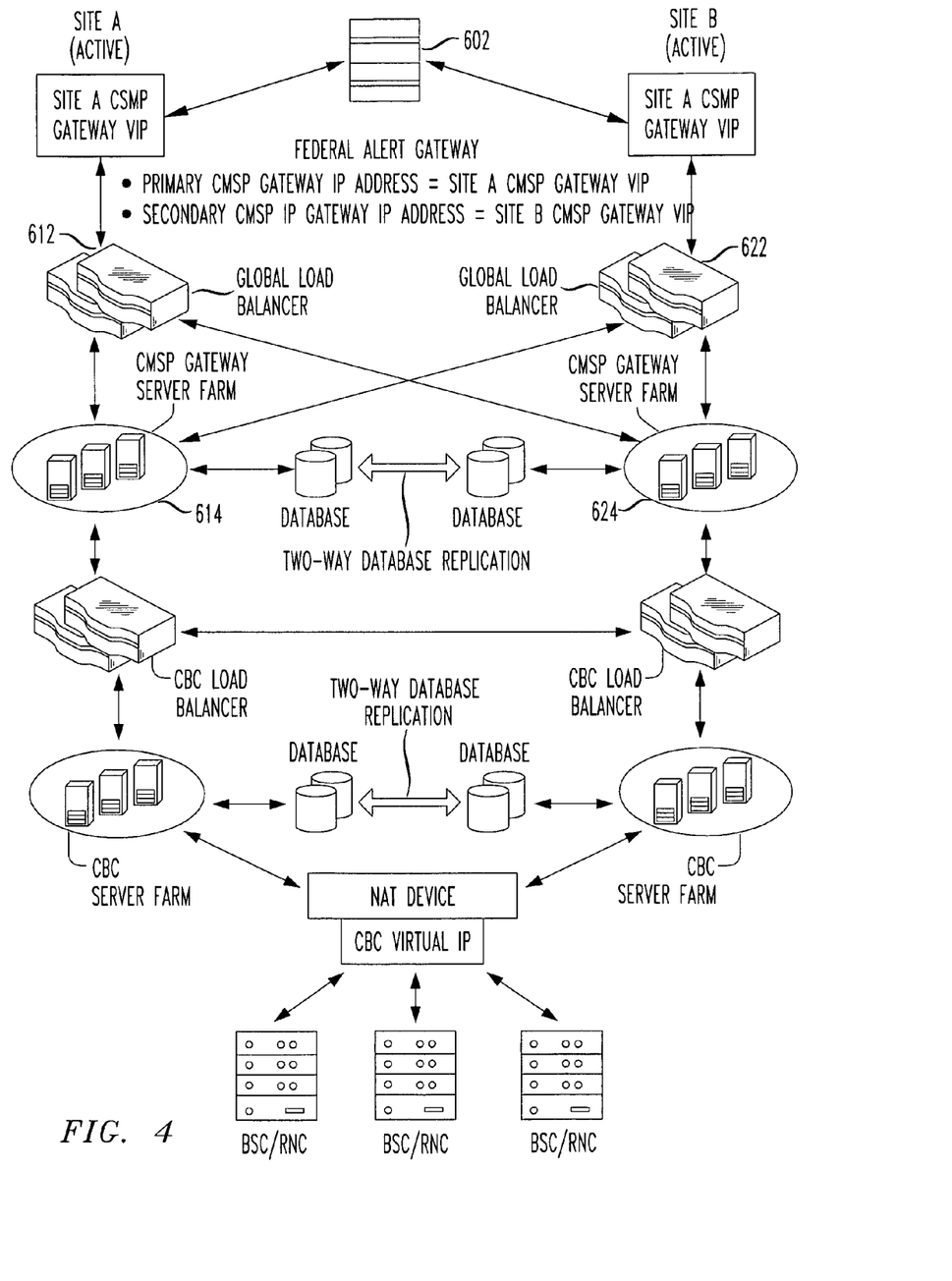
FIG. 4 shows commercial mobile service provider (CMSP) gateway global load balancing performed using geo-redundant global load balancer, in accordance with the principles of the present invention.
Figure 5:
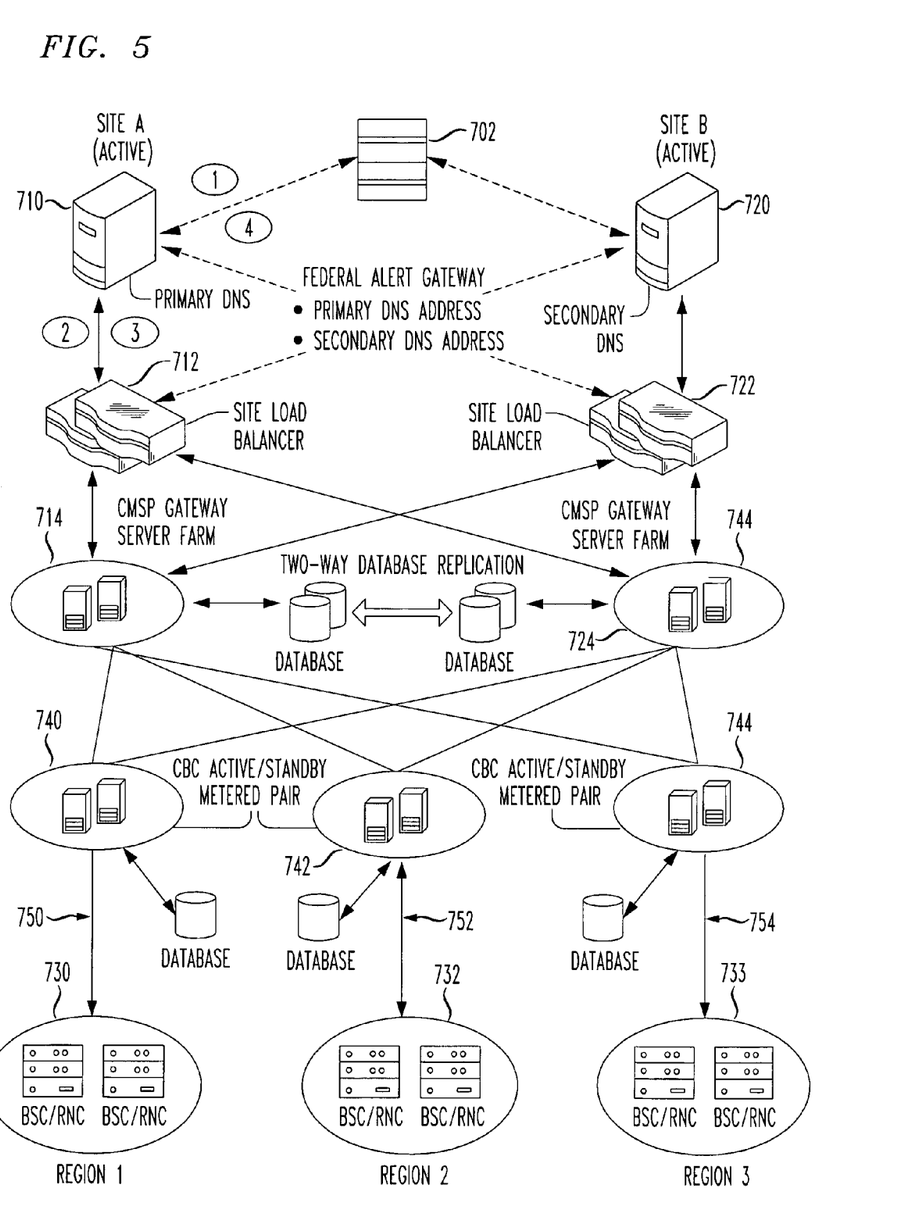
FIG. 5 shows cell broadcast center (CBCs) assigned to different regions of a public land mobile network (PLMN) network, i.e., a distributed system where each CBC is only connected to the BSC/RNCs of a specific region, in accordance with the principles of the present invention.

FIG. 3, FIG. 4 and FIG. 5 show a number of different geo-redundant and high availability implementations of CMAS using the inventive multiple CBC architecture configurations as shown in the embodiments of FIG. 1 and FIG. 2 of the present invention.

In particular, FIG. 3 shows global load balancing achieved by distributing traffic between two sites via a DNS name resolution process, in accordance with the principles of the present invention.

In step 1 of FIG. 3, a Federal Alert Gateway 502 queries a primary DNS 510 for the address of the content management service provider (CMSP) Gateway in the CMSP gateway server farm 514. If the primary DNS 510 is not available, the Federal Alert Gateway 502 queries a secondary DNS 520.

In step 2 of FIG. 3, the relevant DNS server sends an address resolution request to a site load balancer 512 at Site A or a site load balancer 522 at Site B using round robin techniques as a load balance scheme.

In step 3 of FIG. 3, the relevant site load balancer 512, 522 of the selected site serves as a DNS authoritative server. The relevant site load balancer 512, 522 returns the local virtual IP to the relevant DNS server 510, 520 if the local site can handle the traffic; otherwise, it returns the virtual IP (VIP) of its peer site.

In step 4 of FIG. 3, the relevant DNS server 510, 520 returns the virtual IP to the Federal Alert Gateway 502.

Accordingly, the relevant local site CBC load balancer 512, 522 equally distributes the load across all servers in the local CMSP gateway server farm 514, 524. When the CBC load balancer equally distributes the load across all servers in the local CBC server farm 514, 524, if the entire CBC server farm 514, 524 is down, the relevant site CBC load balancer 512, 522 forwards the traffic to its counterpart CBC load balancer 522, 512 at the peer site.

To ensure the message sequence numbers on the CMSP gateway-CBC interface are unique across all CMSP gateway servers including servers of both sites, the present invention allocates a different range of message sequence numbers to the CMSP gateway servers if the message sequence number is an integer. If the message sequence number is expressed in string form, a unique server ID is assigned to each CMSP gateway server, and includes the server ID in the message sequence number.

The same approach shown and described with reference to FIG. 1 is used to ensure that the serial numbers contained in the messages on the CBC-BSC/RNC interface are unique across all CBCs at both sites.

FIG. 4 shows commercial mobile service provider (CMSP) gateway global load balancing performed using geo-redundant global load balancer, in accordance with the principles of the present invention.

In particular, as shown in FIG. 4, CMSP Gateway global load balancing is accomplished by using geo-redundant global load balancer architecture. In these embodiments, a Federal Alert Gateway 602 is configured with primary and secondary CMSP Gateway IP addresses with one pointing to a global load balancer 612 at Site A, and the other to a global load balancer 622 at Site B. If/when the primary site goes down, the Federal Alter Gateway 602 switches to the geo-redundant site. In the example of FIG. 4, commercial mobile service provider (CMSP) gateway server farms 614, 624 at both sites are in active mode. The global load balancer 612, 622 at each site is connected to all CMSP Gateway servers 614, 624 at both sites, and distributes the load across all servers.

As opposed to using DNS Name Resolution process to achieve geo-redundancy and global load balancing as shown in FIG. 3, geo-redundant global load balancers are used in FIG. 4, in which:

The Federal Alert Gateway 602 is configured with primary and secondary CMSP Gateway IP addresses with one pointing to a global load balancer 612 at Site A, and the other to a global load balancer 622 at Site B. If/when the primary site goes down, the Federal Alert Gateway 602 switches to the geo-redundant site.

Also, the global load balancer 612, 622 at each site is connected to all CMSP Gateway servers 614, 624 at both sites, and distributes the load across all servers.

FIG. 5 shows cell broadcast centers (CBCs) assigned to different regions of a public land mobile network (PLMN) network, i.e., a distributed system where each CBC 740, 742, 744 is only connected to the BSC/RNCs of a specific region 730, 732, 733, in accordance with the principles of the present invention.

In FIG. 5 cell broadcast centers (CBCs) are assigned to different regions of a public land mobile network (PLMN) network, i.e., its a distributed system where each CBC is only connected to the BSC/RNCs of a specific region of a PLMN network. (This is in contrast to the embodiments shown in FIG. 1 and FIG. 2 wherein each CBC connects to all BSC/RNCs in a PLMN network).

With the architecture of FIG. 5, CMSP gateway server farms 714, 724 always send the alert message received from the Federal Alert Gateway 702 to the CBCs 740, 742, 744 in all regions regardless of the target area of the alert message.

The CBC 740, 742, 744 of each region performs geo-targeting and sends the received alert message to the BSC/RNCs 730, 732, 733 in its own region that are in the target area of the alert message. The message will be dropped by a CBC if the alert target area has no overlap with the region the CBC controls.

According to these embodiments of the present invention, a cell broadcast center (CBC) active-standby mated pair is used for each region 730, 732, 733. Alternatively, while disclosed in an active/standby mode, the CBC servers in the CBC server farms 740, 742, 740 may alternatively be in active-active configuration in each region 730, 732, 734.

Also according to these embodiments of the invention, DNS name resolution is used to support CMSP gateway global load balancing. Alternatively, CMSP Gateway global load balancing as shown in FIG. 4 may be used.

According to the present invention, the CMSP gateway in the respective CMSP gateway server farms 714, 724 always send the alert message received from the Federal Alert Gateway 702 to the CBCs 740, 742, 744 in all regions regardless of the target area of the alert message. The CBC 740, 742, 744 of each region performs geo-targeting and sends the received alert message to the BSC/RNCs 730, 732, 733 in its own region that are in the target area of the alert message.

Since the mobile device may move from one region to another and therefore may receive different alert messages from different regions, the same approach shown and described with respect to FIG. 1 is used to ensure that the serial numbers contained in the messages on the CBC-BSC/RNC interface 750, 752, 754 are unique across all CBCs in all regions.

While the invention has been described with reference to the exemplary embodiments thereof, those skilled in the art will be able to make various modifications to the described embodiments of the invention without departing from the true spirit and scope of the invention.

What is claimed is:

1. In a commercial mobile alert system (CMAS), geo-redundancy provided by:
   at least one base station controller; and
   a cell broadcast center (CBC) server farm comprised of a plurality of cell broadcast center servers, interfaced to said at least one base station controller, to redundantly service a single given geographic area; and
   a database cluster to commonly share cell site health information with said CBC server farm;
   wherein each of said plurality of cell broadcast center servers is provided a different range of message serial numbers allocated to ensure uniqueness of message sequence numbering when multiple cell broadcast center servers are simultaneously active.

2. In a commercial mobile alert system (CMAS), geo-redundancy provided according to claim 1, wherein:
   one of said plurality of cell broadcast centers (CBCs) is operated in an active mode, while another one of said plurality of cell broadcast centers is operated in a standby mode.

3. In a commercial mobile alert system (CMAS), geo-redundancy provided according to claim 1, wherein:
   at least two of said plurality of cell broadcast centers (CBCs) are each operated in an active mode.

4. A commercial mobile alert system (CMAS), comprising:
   a cell broadcast entity to handle an emergency alert message to be transmitted via a cell broadcast center;
   a cell broadcast center (CBC) server farm, comprising a plurality of CBC servers, to accept said emergency alert message from said cell broadcast entity and to redundantly service a single given geographic area;
   at least one base station controller (BSC), in communication with said plurality of CBC servers, to receive said emergency alert message from only one of said plurality of CBC servers and
   a database cluster to commonly share cell site health information with said CBC server farm;
   wherein each of said plurality of CBC servers is provided a different range of message serial numbers allocated to ensure uniqueness of message sequence numbering when multiple CBC servers are simultaneously active.

5. A commercial mobile alert system (CMAS), comprising:
   a cell broadcast entity to handle an emergency alert message to be transmitted via a cell broadcast center;
   a cell broadcast center (CBC) server farm, comprising a plurality of CBC servers, to accept said emergency alert message from said cell broadcast entity and to redundantly service a single given geographic area;
   at least one radio network controller (RNC), in communication with said plurality of CBC servers, to receive said emergency alert message from only one of said plurality of CBC servers; and
   a database cluster to commonly share cell site health information with said CBC server farm;
   wherein each of said plurality of CBC servers is provided a different range of message serial numbers allocated to ensure uniqueness of message sequence numbering when multiple CBC servers are simultaneously active.

* * * * *